US007160632B2

(12) United States Patent
Nakamura et al.

(10) Patent No.: US 7,160,632 B2
(45) Date of Patent: Jan. 9, 2007

(54) MATERIAL FOR SLIDING CONTACTS, CLAD COMPOSITE MATERIAL AND SMALL-SIZED DC MOTOR USING THE SAME

(75) Inventors: Keiji Nakamura, Chiba (JP); Yasuhiro Hashimoto, Chiba (JP); Masahiro Takahashi, Hiratsuka (JP); Shuichi Kubota, Hiratsuka (JP); Takao Asada, Hiratsuka (JP); Toshiya Yamamoto, Hiratsuka (JP)

(73) Assignees: Mabuchi Motor Co., Ltd., Matsudo (JP); Tanaka Kikinzoku kogyo K.K., Tokyo (JP)

( * ) Notice: Subject to any disclaimer, the term of this patent is extended or adjusted under 35 U.S.C. 154(b) by 45 days.

(21) Appl. No.: 10/989,554

(22) Filed: Nov. 17, 2004

(65) Prior Publication Data

US 2005/0116576 A1 Jun. 2, 2005

(30) Foreign Application Priority Data

Nov. 26, 2003 (JP) ............................. 2003-395181

(51) Int. Cl.

| | |
|---|---|
| ***B32B 15/04*** | (2006.01) |
| ***B32B 15/20*** | (2006.01) |
| ***C22C 5/06*** | (2006.01) |
| ***C22C 5/08*** | (2006.01) |
| ***H01H 1/0237*** | (2006.01) |

(52) U.S. Cl. ....................... 428/673; 428/674; 420/502; 420/504; 420/506; 200/266; 200/268; 200/270

(58) Field of Classification Search ................ 420/501, 420/502, 504, 506; 428/674, 673, 929, 614; 200/266, 267, 268, 270; 310/233

See application file for complete search history.

(56) References Cited

U.S. PATENT DOCUMENTS 6,245,166 B1 * 6/2001 Shibuya et al. ............. 148/431

FOREIGN PATENT DOCUMENTS

| | | | |
|---|---|---|---|
| JP | 52-050558 | * | 4/1977 |
| JP | 56-130094 | * | 10/1981 |
| JP | 56-130094 | A | 10/1981 |
| JP | 58-084949 | A | 5/1983 |
| JP | 58-104136 | A | 6/1983 |
| JP | 58-104140 | A | 6/1983 |
| JP | 58-107441 | A | 6/1983 |
| JP | 58-107456 | A | 6/1983 |
| JP | 58-107457 | A | 6/1983 |
| JP | 58-110638 | A | 7/1983 |
| JP | 58-110643 | A | 7/1983 |
| JP | 58-130747 | A | 8/1983 |
| JP | 59-177340 | A | 10/1984 |
| JP | 06-220555 | A | 8/1994 |
| JP | 07/166268 | A | 6/1995 |
| JP | 08-260078 | A | 10/1996 |

* cited by examiner

*Primary Examiner*—Michael E. LaVilla
(74) *Attorney, Agent, or Firm*—Rothwell, Figg, Ernst & Manbeck, P.C.

(57) ABSTRACT

The invention provides a material for sliding contacts that is suitable for a small-sized DC motor used in recent down-sized CD players and is excellent in durability. A material for sliding contacts used in a commutator of a small-sized DC motor that consists essentially of 0.01 to 3.0% Ni by weight, 0.01 to 6.0% ZnO by weight and/or 0.01 to 3.0% MgO by weight, furthermore, in some cases, 0.01 to 5.0% Cu by weight, and the balance Ag, in which Ni metal particles, ZnO particles or MgO particles are dispersed in the matrix of Ag.

23 Claims, 4 Drawing Sheets

MATERIAL FOR SLIDING CONTACTS, CLAD COMPOSITE MATERIAL AND SMALL-SIZED DC MOTOR USING THE SAME

BACKGROUND OF THE INVENTION

1. Field of the Invention

The present invention relates to a commutator of a small-sized DC motor that performs electrical opening and closing by mechanical sliding motions and, more particularly, to a commutator for a small-sized DC motor used in the loading and unloading of a CD in a CD player and in the pick feed for moving a lens to read out CD signals, and a material for sliding contacts that constitutes a commutator (in addition, an earth ring, a rotary switch, etc.) of a small-sized DC motor used in home electric appliances that are driven by charging type batteries.

2. Description of the Related Art

In recent years, in the above-described technical field, research on new materials for sliding contacts has been actively carried out. With respect to a material for sliding contacts that constitutes a commutator of a small-sized DC motor, it can be said that it is the most important development problem to make the wear during the use of contacts ideal and to realize low contact resistance. Essentially, low contact resistance of a material for sliding contacts can be realize by ensuring that the materials that should come into contact with each other come into positive contact or are brought into close contact, to say nothing of the electrical conductivity of the material for sliding contacts itself. However, when the material slides, the higher the degree of contact or close contact of the materials that come into contact with each other, the higher the frictional resistance will be. And if sliding is caused against this friction, remarkable wear phenomena will occur. That is, in a material for sliding contacts, it is impossible to obtain those having ideal properties unless the above-described phenomena that mutually contradictory are essentially controlled. Also, there are many scientifically unclear points in the wear phenomena of sliding contacts and it is said that to control the wear phenomena by improving materials for sliding contacts is very difficult.

Types of wear in materials for sliding contacts are broadly divided into adhesive wear and abrasive wear. Usually, even when the surface of a material for sliding contacts is finished considerably smooth, microscopically the surface is not a complete plane and many fine irregularities are present. When such metal surfaces are brought into contact with each other, apparently they seem to be in contact with each other with a wide area. In reality, however, protuberant portions of the fine irregularities present on the surfaces are in contact with each other, and hence what is called a true contact area is small than an apparent contact area. For this reason, a large pressure is applied to this true contact part, i.e., the protuberances that have come into contact and the coagulation of metals that come into contact with each other occurs, as a result of which a soft metal is torn and transfers into a hard metal. This is coagulant wear. Also when materials having different hardness come into contact with each other or when in the case of contact of soft metals, one soft metal contains hard particles, the soft metal is mechanically sheared by the hard metal and scratch wear occurs.

These wear phenomena depend greatly on the hardness of metal materials that come into contact with each other, bonding properties of these metals, etc. And basically, the wear phenomena of materials for sliding contacts become remarkable in proportion to contact pressure and are reduced by the hardening of materials. However, wear phenomena change remarkably depending on changes in temperature and humidity during contact and the presence of corrosive components, organic steam, dust, etc. And because these changes in wear phenomena are changes in the contact condition in contact points, they cause an increase in contact resistance and have a great effect on stable keeping of low contact resistance.

When a clad composite material that uses a material for sliding contacts is incorporated in a small-sized DC motor as a commutator and the motor is driven at high speed revolutions, the above-described wear phenomena occur between the commutator and a brush. That is, the material for sliding contacts that constitutes the commutator is subjected to contact friction for a long time and frictional heat by sliding is added, with the result that the above-described coagulant wear and scratch wear occur in a complex manner. For this reason, the surface of the material for sliding contacts is ground by the wear phenomena and wear particles occur. The wear particles increase contact resistance and fill gaps of the commutator, causing conduction and short-circuiting, generating noise and the like.

Furthermore, when the wear phenomena proceed, in a clad composite material that uses a material for sliding contacts, a metal provided in the surface layer of the clad composite material, i.e., the material for sliding contacts is broken by wear and it follows that the wear proceeds to a base material under the surface layer. When the base material of this clad composite material comes to a state in which the base material is worn, the base material that is apt to be oxidized becomes exposed and, therefore, various electrical troubles may sometimes be caused by metal oxides of the base material. For this reason, when what is called a two-layer or three-layer clad composite material is formed and used as a commutator, it can be said that improving the material for the alloys that compose each layer is a very important problem.

In recent years, as materials for sliding contacts for a commutator for a small-sized DC motor used in the loading and unloading of a CD in a CD player and in the pick feed for moving a lens to read out CD signals and materials for sliding contacts for a commutator of a small-sized DC motor used in home electric appliances that are driven by charging type batteries, there have been used two-layer clad composite materials in which an Ag—Cd alloy containing 1 to 2% Cd by weight and the balance Ag is used as the surface layer and Cu or a Cu alloy is used in the base layer (for example, Ag99-Cd1/Cu), two-layer clad composite materials in which an Ag—Cd—Ni alloy containing 1 to 2% Cd by weight, 0.01 to 0.70% Ni by weight and the balance Ag is used as the surface layer and Cu or a Cu alloy is used in the base layer (for example, Ag97.7-Cd2-Ni0.3/Cu), etc. The “alloy composition/Cu” described in parentheses means a clad composite material that constitutes two layers and “/” means an interface between the surface layer and the base layer. The numerals described behind the alloy composition elements indicate values in % by weight.

These Ag—Cd alloys and Ag—Cd—Ni alloys are materials excellent in electrical properties, hardness and low contact resistance and they are disclosed, for example, in the Japanese Patent Publication No. 2-60745 as a material for sliding contacts for a commutator of a small-sized DC motor that is an Ag alloy containing 1 to 5%, by weight, of at least one kind selected from the group consisting of Sn and Cd and the balance Ag. However, when the environmental problems of today and the like are considered, the manufacturing and use of materials for sliding contacts that contain Cd, which is considered a harmful substance, are not desirable.

Ag—Cu alloys, Ag—Cu—Cd alloys, etc. are also used as other alloy systems. However, in these materials for sliding contacts, changes with time occur in contact resistance although the contact resistance in the initial stage of use is low. For this reason, this poses the problem that a deterioration in the product value of shavers using charging type batteries occurs. That is, when materials for sliding contacts of these alloy systems are used in a small-sized DC motor are used, the start voltage of the motor increases because contact resistance increases due to changes with time. In other words, the time in which the electromotive force of the battery decreases to below the start voltage of the motor becomes short, and this poses that problem that the motor does no start immediately. As a result, the charging frequency of the battery increases and the life of the battery itself shows a tendency to become short.

Also, for example, the Japanese Patent Laid-Open No. 58-104140 discloses a material for sliding contacts of Ag—Zn-based alloy in which 1 to 10% Zn by weight and 0.5 to 1.0%, by weight, of at least one kind selected from the group consisting of Te, Co, Ni, Cu, Ge, Ti and Pb are added to Ag. In this material for sliding contacts, by making the most of the nature of Te, Co, Ni, Cu, Ge, Ti and Pb that these metals are more easily oxidized than Zn, these metals are contained, whereby the oxidation of Zn is suppressed, the sulfuration resistance and lubricity of the material for sliding contacts are maintained, and the improvement of wear resistance and stabilization of low contact resistance are aimed at. However, also in this material for sliding contacts, as with the above-described Ag—Cu alloys and the like, changes with time occur in contact resistance tends to increase when the use period becomes long although the contact resistance in the initial stage of use is low.

Furthermore, the Japanese Patent Laid-Open No. 8-260078 discloses materials for sliding contacts of Ag—Zn alloy and Ag—Zn—Ni alloy. Also these materials for sliding contacts have low contact resistance, they cannot be said to be materials for sliding contacts that can control the wear phenomena to such an extent that motor life can be improved.

SUMMARY OF THE INVENTION

As described above, it cannot be said that conventional materials for sliding contacts can adequately comply with the specifications for loading and pick feed of recent downsized CD players. With CD players downsized, also DC motors used in the CD players have been downsized. However, the specifications for loading of CD players themselves specify the same torque that has hitherto been required regardless of motor size. For this reason, even when motors are downsized, high speed revolutions of not less than 10000 rpm are used and necessary torque is realized via gears. However, the properties of conventional materials for sliding contacts cannot sufficiently adapt to this high speed revolution region of not less than 10000 rpm, and more durable, excellent materials for sliding contacts are strongly desired.

The object of the present invention is to provide a material for sliding contacts that has an alloy composition not containing harmful substances such as Cd, is excellent particularly in contact resistance, has good electrical functions, does not show changes with time, and has wear resistance standing comparison with that of conventional materials for sliding contacts in terms of practical use and to extend motor life by using the material for sliding contacts having excellent properties in a commutator of a small-sized DC motor.

The present inventors devoted themselves to research in order to solve the above-described problems and as a result they hit upon the present invention. The invention provides a material for sliding contacts used as a commutator of a small-sized DC motor consisting essentially of 0.01 to 3.0% Ni by weight, 0.01 to 6.0% ZnO by weight, and the balance Ag, in which Ni metal particles and ZnO particles are dispersed in a matrix of Ag.

A material for sliding contacts related to the invention is an alloy in which Ni metal particles and ZnO particles are dispersed in the matrix of Ag. This ZnO dispersed in the matrix of Ag has a role of a lubricating material in sliding parts and can reduce frictional resistance and improve wear resistance.

Also conventional materials for sliding contacts, for example, Ag—Zn alloys and Ag—Cu alloys, are aimed to control wear phenomena by the formation of oxide films of ZnO and CuO. However, when left standing in the air, these alloys excessively generate ZnO and CuO in contact parts with the lapse of time, conversely increasing contact resistance. In particular, when CuO having low electrical conductivity is excessively generated, the increase in contact resistance becomes remarkable. Also in the case of ZnO having electrical conductivity, excessive generation of ZnO causes an increase in contact resistance.

On the other hand, in a material for sliding contacts of the invention, although the Ni metal particles dispersed in the matrix of Ag very slightly form NiO on the surfaces of the particles, the whole contact surface will not be covered with NiO because Ni is present in the material as metal particles. Also, because ZnO dispersed in the matrix of Ag is dispersed beforehand in the material as an oxide, the whole material will not be covered with ZnO. That is, unlike conventional materials for sliding contacts of Ag—Zn alloy etc., a material for sliding contacts of the invention will not increase contact resistance by ZnO although it has a composition containing Zn.

In order to cause Ni metal particles and ZnO particles to be dispersed in the matrix of Ag as in the case of a material for sliding contacts of the invention, this can be realized by manufacturing the material for sliding contacts by what is called the powder metallurgy process. According to the powder metallurgy process, the Ni metal particles and ZnO oxide particles present in the matrix of Ag are very uniformly dispersed. However, when existing melting processes are employed, it is impossible to manufacture a material for sliding contacts having the same composition and structure as in the invention.

The Ni metal particles in a material for sliding contacts of the invention have the main role of improving the wear resistance of the material for sliding contacts. If the Ni content is less than 0.01% by weight, the effect on an improvement in wear resistance by the Ni metal particles tends to become small. If the Ni content exceeds 3.0% by weight, an improvement in wear resistance has an adverse effect and the brush is worn, with the result that the endurance and life of the motor are reduced. By setting the Ni content in the composition range of 0.3 to 1.0% by weight, it is ensured that a material for sliding contacts related to the invention can exhibit its best properties.

The ZnO in a material for sliding contacts of the invention works as a solid phase antifriction material in sliding parts, i.e., on contact surfaces. If the ZnO content is less than 0.01% by weight, ZnO tends to cease performing the function as an antifriction material. If the ZnO content exceeds 6.0% by weight, the workability of a material for sliding contacts tends to decrease, at the same time, the stability of contact resistance tend to decrease. By setting the ZnO content in the composition range of 0.5 to 5.0% by weight, it is ensured that sliding contacts can exhibit their best properties.

The present inventors found that a similar effect is obtained also by causing the above-described material for sliding contacts of the invention to contain Cu. Another material for sliding contacts of the invention consists essentially of 0.01 to 3.0% Ni by weight, 0.01 to 6.0% ZnO by weight, 0.01 to 5.0% Cu by weight, and the balance Ag, and Ni metal particles and ZnO particles are dispersed in a matrix of an AgCu alloy.

This material for sliding contacts related to the invention is such that Cu is dissolved in a solid state in the matrix of Ag. The Cu dissolved in a solid state forms a very thin oxide film of CuO on a contact surface during sliding and has the action of suppressing coagulant wear without increasing contact resistance. However, if the Cu content is less than 0.01% by weight, the effect of Cu addition is not observed. If the Cu content exceeds 5.0% by weight, the workability of a material for sliding contacts is decreased and, at the same time, the stability of contact resistance tends to decrease. By setting the Cu content in the composition range of 0.5 to 3.0% by weight, it is ensured that a material for sliding contacts of the invention can have best properties.

The present inventors found that also in a case where ZnO is replaced by MgO, the same effect as with the above-described material for sliding contacts of the invention is obtained and excellent properties at high temperatures are further ensured. That is, there is provided a material for sliding contacts consisting essentially of 0.01 to 3.0% Ni by weight, 0.01 to 3.0% MgO by weight, and the balance Ag, in which Ni metal particles and MgO particles are dispersed in a matrix of Ag. Also, there is provided a material for sliding contacts consisting essentially of 0.01 to 3.0% Ni by weight, 0.01 to 3.0% MgO by weight, 0.01 to 5.0% Cu by weight, and the balance Ag, in which Ni metal particles and MgO particles are dispersed in a matrix of an AgCu alloy.

The present inventor found that compared to the above-described materials for sliding contacts of the invention in which ZnO particles are dispersed, enduring life at high temperatures can be further improved in the materials for sliding contacts in which MgO particles are dispersed. If the MgO content is less than 0.01% by weight, this MgO tends to cease contributing to an improvement in enduring life at high temperatures. If the MgO content exceeds 3.0% by weight, the workability of a material for sliding contacts decreases and, at the same time, the stability of contact resistance tends to decrease. By setting the MgO content in the composition range of 0.3 to 1.5% by weight, it is ensured that a material for sliding contacts of the invention can have best properties.

In the above-described materials for sliding contacts of the invention, ZnO and MgO each may be contained singly or in combination. That is, when both ZnO and MgO are contained, there is provided a material for sliding contacts consisting essentially of 0.01 to 3.0% Ni by weight, 0.01 to 6.0% ZnO by weight, 0.01 to 3.0% MgO by weight, 0.01 to 5.0% Cu by weight, and the balance Ag, in which Ni metal particles, ZnO particles and MgO particles are dispersed in the matrix of an AgCu alloy. Thus, when both ZnO and MgO are contained, a material for sliding contacts of the invention obtains excellent wear resistance and enduring life characteristics at high temperature and is well balanced in total characteristics.

In a case where any of the above-described materials for sliding contacts related to the invention is used as a commutator of a motor, in order to make it a more preferred component material of a commutator, it is desirable to adopt a clad composite material in which a base material of Cu or a Cu alloy is used and a material for sliding contacts related to the invention is embedded in part of this base material. This improves solderability in soldering treatment that is necessary for the electrical connection of a commutator and also workability when a material for sliding contacts is shaped as a commutator. By adopting the form of a clad composite material, it is possible to control the thickness of a material for sliding contacts of the invention to be embedded in the base material according to a motor to be used, and the expensive material for sliding contacts can be used only in necessary parts. Therefore, the material for sliding contacts can be made an economically preferred one.

In a clad composite material in which a base material of Cu or a Cu alloy is used, the part of the embedded material for sliding contacts that is exposed to the surface is exposed to the air, this part has a tendency toward sulfuration. Hence, in the case of a clad composite material in which a material for sliding contacts of the invention is embedded in part of a base material of Cu or a Cu alloy, it is more preferred that at least part of the material for sliding contacts be covered with Au or an Au alloy. Although Au or an Au alloy is known to be a good material for sliding contacts that is excellent in corrosion resistance and realizes low contact resistance, to use Au or an Au alloy in a large amount is economically disadvantageous because Au or an Au alloy is expensive. Therefore, by covering only part of a material for sliding contacts related to the invention with Au or an Au alloy, an increase in cost is minimized and, at the same time, the sulfuration phenomenon of the material for sliding contacts according to the invention is effectively prevented. If such a clad composite material is used in a commutator of a small-sized DC motor, good motor driving is possible in the initial stage of use owing to the excellent contact resistance characteristics of Au or an Au alloy. Hence, even when the Au or the Au alloy is broken by wear, the material for sliding contacts of the invention is present in the interior, with the result that the continuation of further use is possible.

Furthermore, when what is called a two-layer or three-layer clad composite material of the above-described invention is used as a commutator in a small-sized DC motor, low contact resistance can be realized in a stable manner, changes with time little occur, there is no hindrance by wear particles, and it is possible to drive the small-sized DC motor with a low starting voltage. This means that the life of a small-sized DC motor can be extended when the two-layer or three-layer clad composite material is used in the loading and pick feed of a CD player.

A material for sliding contacts according to the invention does not contain harmful substances such as Cd, has good electrical properties, does not show changes with time, and has wear resistance standing comparison with that of conventional materials for sliding contacts in terms of practical use. And by being applied to home electric appliances having a small-sized DC motor that uses a charging type battery, in particular, a material for sliding contacts of the invention keeps low contact resistance with the lapse of time and can start the motor at a low staring voltage. This permits continuous use of the motor for a long period, which could not be realized with conventional materials for sliding contacts. Furthermore, it is possible to extend also the life of a charging type battery that drives a small-sized DC motor.

DETAILED DESCRIPTION OF THE PREFERRED EMBODIMENTS

Figure 1:
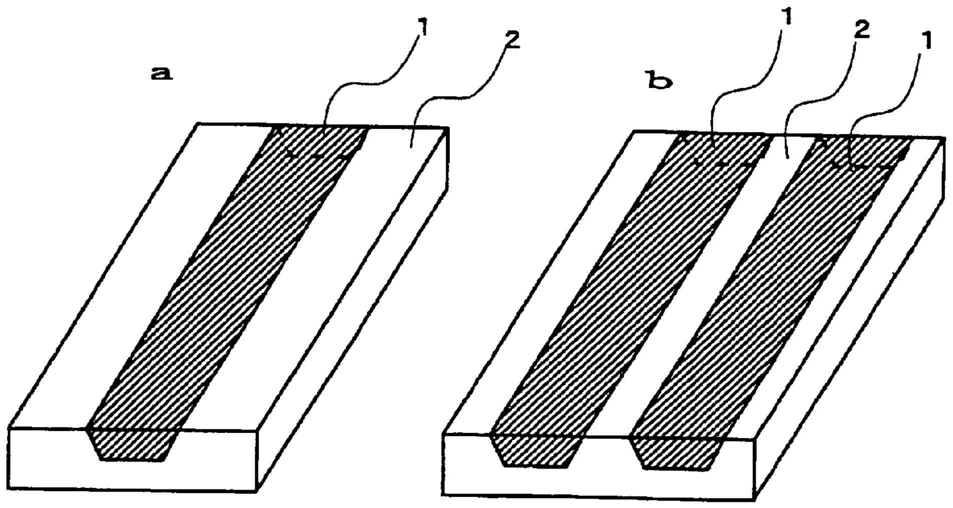
FIG. 1 is a perspective view of a two-layer clad composite material.

Preferred embodiments of the invention will be described below on the basis of the embodiments and conventional comparative examples, which will be given below. Table 1 shows compositions of the materials for sliding contacts of Embodiments 1 to 11, and Table 2 shows compositions of the materials for sliding contacts of Conventional Examples 1 and 2 that were used in comparing properties.

TABLE 1

| | Ni | ZnO | MgO | Cu | Ag |
|---|---|---|---|---|---|
| Embodiment 1 | 0.5 | 5.5 | — | — | Balance |
| Embodiment 2 | 0.5 | 2.0 | — | 0.5 | Balance |
| Embodiment 3 | 0.5 | 2.0 | — | 2.0 | Balance |
| Embodiment 4 | 0.5 | 4.0 | — | 0.5 | Balance |
| Embodiment 5 | 0.5 | 4.0 | — | 2.0 | Balance |
| Embodiment 6 | 0.5 | 4.0 | — | 3.0 | Balance |
| Embodiment 7 | 0.5 | — | 1.0 | — | Balance |
| Embodiment 8 | 0.5 | — | 1.0 | 2.0 | Balance |
| Embodiment 9 | 0.5 | — | 1.0 | 3.0 | Balance |
| Embodiment 10 | 0.5 | 2.5 | 0.5 | 2.0 | Balance |
| Embodiment 11 | 0.5 | 2.5 | 0.5 | 3.0 | Balance |

(wt %)

TABLE 2

| | Cu | Zn | Mg | Ni | Ag |
|---|---|---|---|---|---|
| Conventional Example 1 | 6.0 | 1.0 | — | 0.5 | Balance |
| Conventional Example 2 | 10.0 | — | 0.3 | — | Balance |

(wt %)

In the material for sliding contacts of Embodiment 1, an Ni powder in an amount of 0.5% by weight, a ZnO powder in an amount of 5.5% by weight and an Ag powder as the balance were stirred for 4 hours by use of a ball mill and a powder mixture in which each powder is uniformly distributed was obtained. The powder mixture was filled in a cylindrical container and subjected to compression forming, which involves applying a pressure of $4.9\times10^5$N (50 tf) from the longitudinal direction of the cylinder, whereby a cylindrical billet 50 mm in diameter was formed. Subsequently, this cylindrical billet was subjected to vacuum sintering treatment (5.0 Pa) for 4 hours at a temperature of 1123 K (850° C.). The compression forming and sintering treatment were repeated four times.

The cylindrical billet subjected to compression forming and vacuum sintering treatment was hot extruded, whereby a wire rod 6.0 mm in diameter was formed. Subsequently, a wire rod 1.6 mm in diameter was obtained by wire drawing.

Also, for the materials for sliding contacts of Embodiment 2 to Embodiment 11, powder mixtures of the compositions shown in Table 1 were fabricated and subjected to working in the same steps as in Embodiment 1 above, whereby wire rods 1.6 mm in diameter were obtained.

Conventional Examples 1 and 2 are materials for sliding contacts obtained by the melting process. Each metal was melted to obtain each composition shown in Table 2 and subjected to casting, extrusion and wire drawing, whereby wire rods 1.6 mm in diameter were obtained. For the manufacturing method of the materials for sliding contacts of the conventional examples, details are given in the Japanese Patent Laid-Open No. 6-220555 and the Japanese Patent Laid-Open No. 7-166268.

Each of the wire rods thus formed was worked in tape form by use of a rolling mill and inlaid into a Cu material, which becomes a base layer, whereby a clad composite material was obtained. This clad composite material was heat treated at 1023 K (750° C.) and a two-layer clad composite material having a total thickness of 0.2 mm and a width of 19 mm was obtained by repeating rolling.

Figure 2:
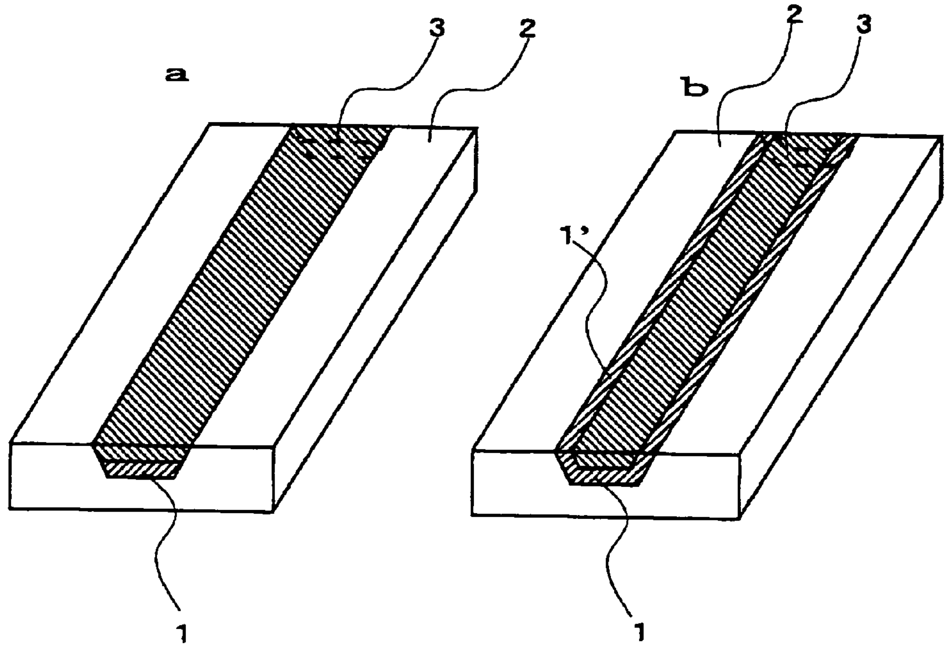
FIG. 2 is a perspective view of a three-layer clad composite material.

Next, a mode of embodiment of a clad composite material related to the invention will be described. The perspective view of FIG. 1 shows what is called a two-layer clad composite material in which a material for sliding contacts shown in this mode of embodiment is embedded in part of a base material formed from a Cu alloy. The perspective view of FIG. 2 shows what is called a three-layer clad composite material in which a material for sliding contacts shown in this embodiment is embedded in part of a base material formed from a Cu alloy and part of the embedded material for sliding contacts is covered with Au or an Au alloy. FIG. 1*a*, FIG. 2*a* and FIG. 2*b* show a single-clad composite material and FIG. 1*b* shows a double-clad composite material. In the figures, the numeral 1 denotes a material for sliding contacts of the invention, the numeral 1' in FIG. 2*b* an exposed portion that shows a partially exposed part of the embedded material for sliding contacts 1, the numeral 2 a base material of a Cu alloy, the numeral 3 Au or an Au alloy.

Furthermore, small-size DC motors were actually assembled by using the above-described clad composite materials, and the endurance performance of the motors was investigated. The results will be described below. The two-layer clad composite materials shown in FIG. 1*a* above were fabricated from the materials for sliding contacts of the compositions shown in Tables 1 and 2 and worked into three-pole commutators, which were built in small-sized DC motors. The conditions for the endurance test are shown in Table 3.

TABLE 3

| | |
|---|---|
| Voltage | DC 4 V |
| Current | 120 mA |
| Mode | Repetition of:<br>170 ms (clockwise) - 50 ms (stop)<br>170 ms (anticlockwise) - 50 ms (stop) |
| Number of revolutions of motor | 14,000 rpm |
| Load | 1.5 g - cm |
| Test temperature | 75° C., Room temperature, 0° C. |
| Number of motors | 5 units |

Figure 3:
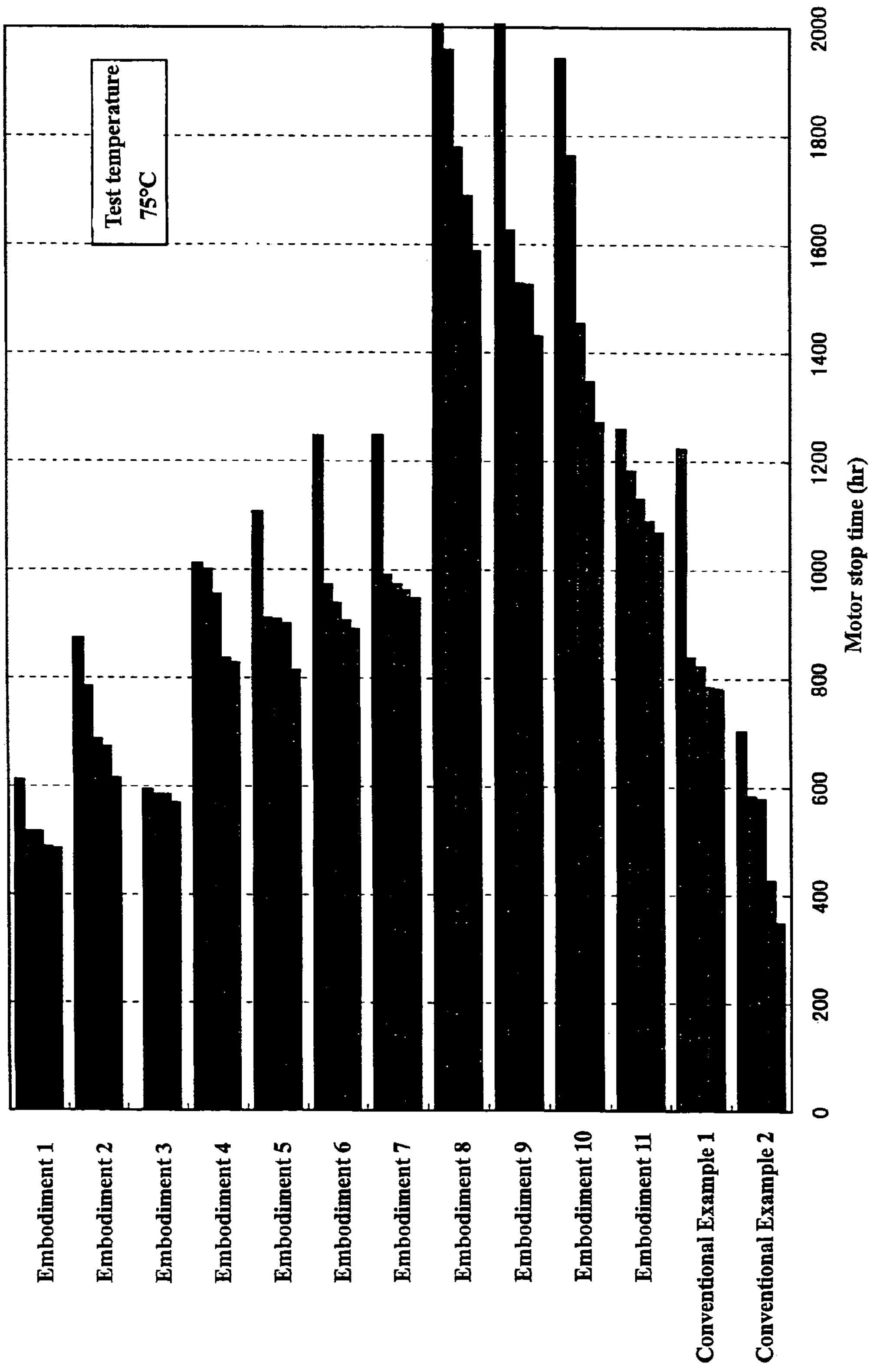
FIG. 3 is a bar graph that shows results of an endurance test at a test temperature of 75° C.
Figure 4:
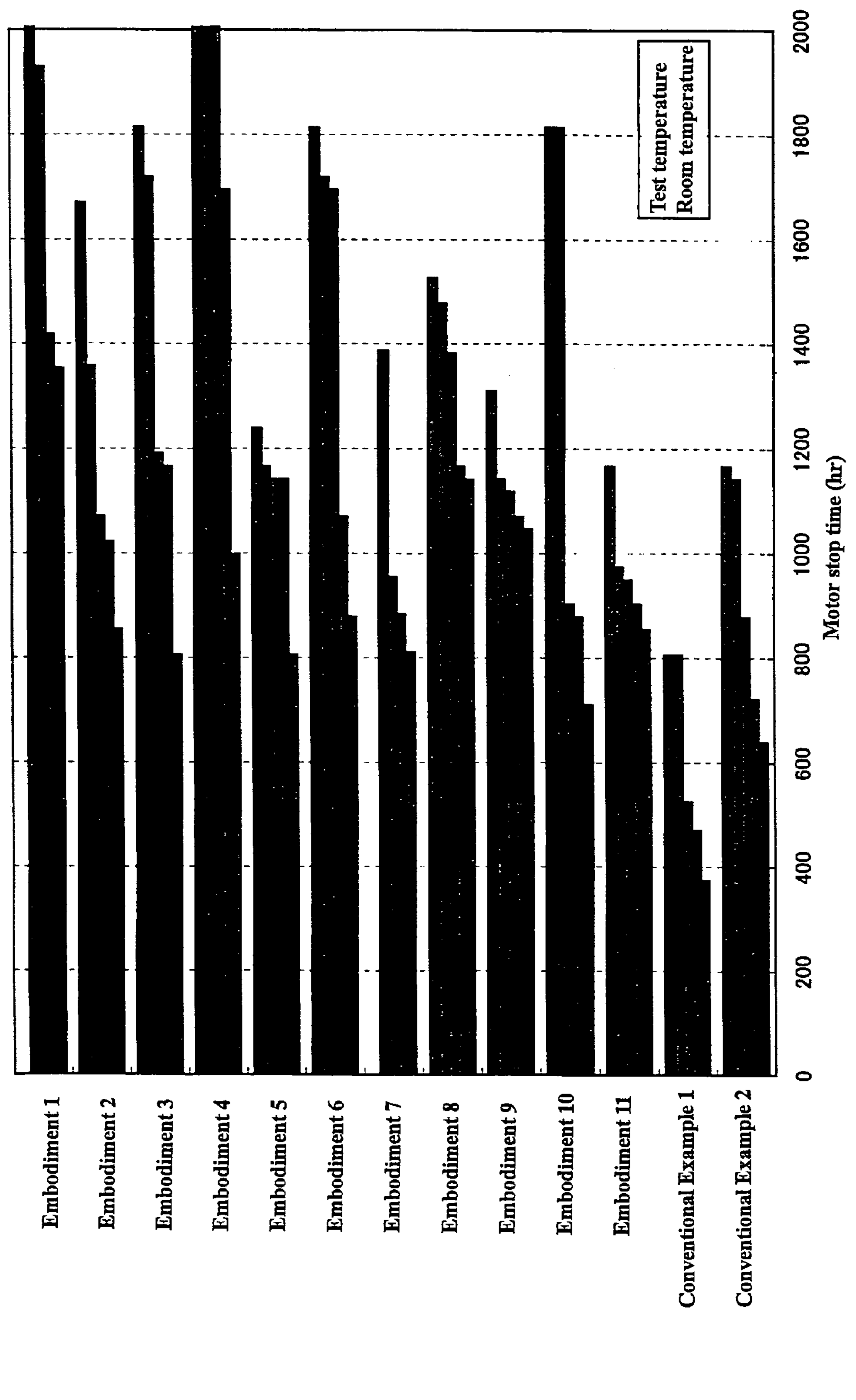
FIG. 4 is a bar graph that shows results of an endurance test when the test temperature was room temperature.
Figure 5:
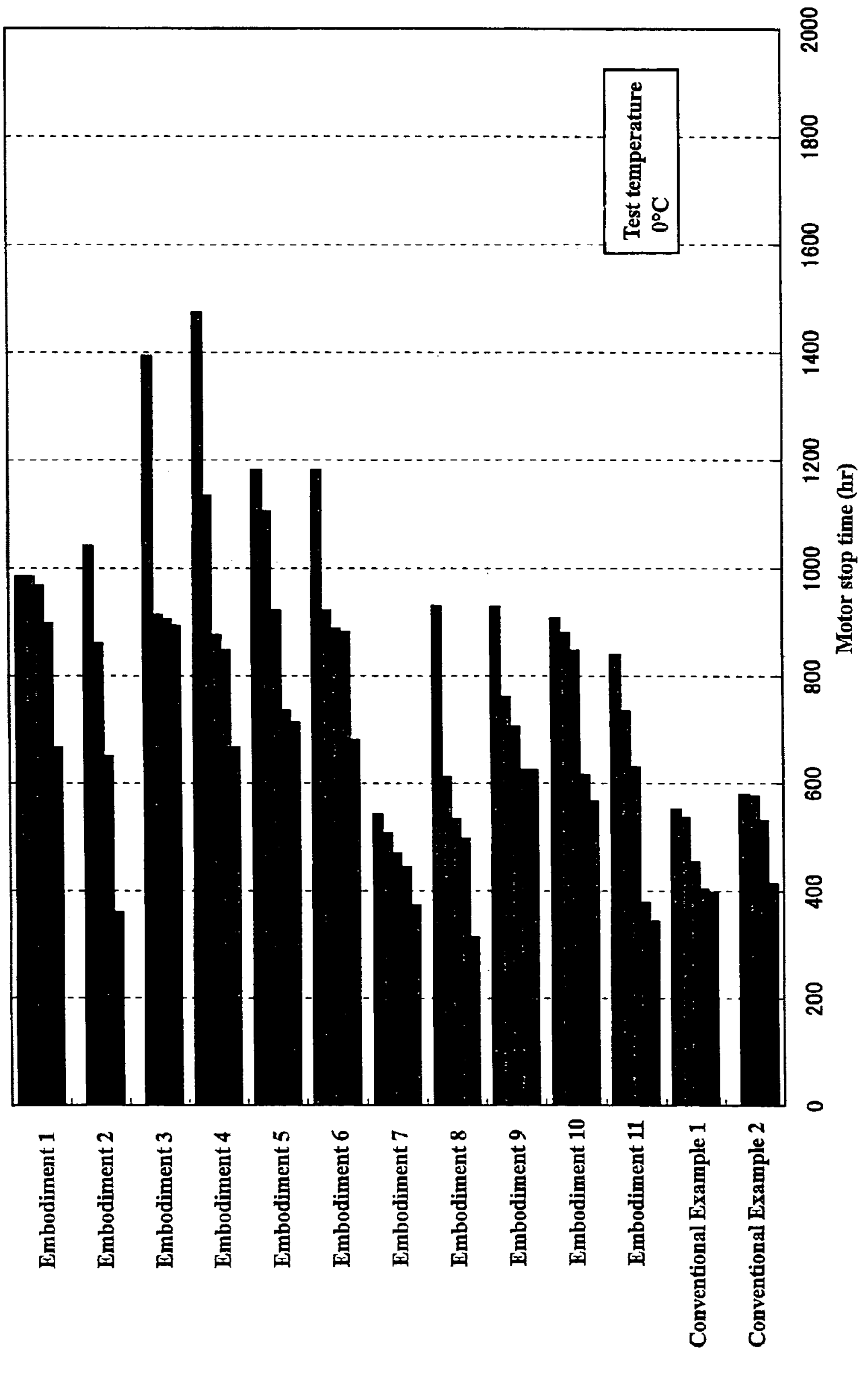
FIG. 5 is a bar graph that shows results of an endurance test at a test temperature of 0° C.

The endurance test was carried out at three test temperature levels of 75° C., room temperature (25° C.) and 0° C. FIGS. 3 to 5 each show a bar graph related to values of endurance time at which each motor became inoperative in the endurance test. Table 4 shows the average endurance time calculated on the basis of the time data shown in the graphs of FIGS. 3 to 5.

TABLE 4

| | Test temperature | | |
|---|---|---|---|
| | 75° C. | Room temperature | 0° C. |
| Embodiment 1 | 523 | 1777 | 899 |
| Embodiment 2 | 726 | 1195 | 728 |
| Embodiment 3 | 583 | 1339 | 1025 |
| Embodiment 4 | 926 | 1795 | 999 |
| Embodiment 5 | 928 | 1099 | 931 |
| Embodiment 6 | 990 | 1435 | 910 |
| Embodiment 7 | 1024 | 1009 | 467 |
| Embodiment 8 | 1806 | 1339 | 577 |
| Embodiment 9 | 1625 | 1137 | 729 |
| Embodiment 10 | 1556 | 1224 | 762 |
| Embodiment 11 | 1146 | 969 | 584 |
| Conventional Example 1 | 889 | 596 | 468 |
| Conventional Example 2 | 527 | 909 | 525 |

(hr)

FIG. 3 shows the case of 75° C., FIG. 4 the case of room temperature, and FIG. 5 the case of 0° C. As is apparent from FIG. 4, it became evident that in all Embodiments 1 to 11, the endurance time is longer than in Conventional Examples 1 and 2 at room temperature.

In the case of a test temperature of 75° C., it became evident that the materials for sliding contacts of Embodiments 7 to 11 that contain MgO are excellent in endurance characteristics. On the other hand, in the case of a test temperature of 0° C., it became evident that the materials for sliding contacts of Embodiments 1 to 6 that contain ZnO are excellent in endurance characteristics. From this, it was thought that the materials for sliding contacts of the embodiments that contain MgO are suitable for small-sized DC motors for automobiles that are to be used in high-temperature atmospheres. In contrast, it was thought that the materials for sliding contacts of the embodiments that contain ZnO are suitable for small-sized DC motors etc. that are used in low-temperature atmospheres, for example, in automatic icemakers of refrigerators. And it was ascertained that the materials for sliding contacts that contain both ZnO and MgO are materials for sliding contacts having characteristics that permit general-purpose use from low- to high-temperature regions.

What is claimed is:

1. A material for sliding contacts used as a commutator of a small-sized DC motor, wherein said material for sliding contacts consists essentially of 0.01 to 3.0% Ni by weight, 0.01 to 6.0% ZnO by weight, and the balance Ag, and the balance Ag, and wherein Ni metal particles and ZnO particles are dispersed in a matrix of an AgCu alloy.

2. A clad composite material in which the material for sliding contacts according to claim 1 is embedded in part of a base material of Cu or a Cu alloy.

3. A small-sized DC motor that uses the clad composite material according to claim 2 as a commutator.

4. A clad composite material in which the material for sliding contacts according to claim 1 is embedded in part of a base material of Cu or a Cu alloy, at least part of the embedded material for sliding contacts being coated with Au or an Au alloy.

5. A small-sized DC motor that uses the clad composite material according to claim 4 as a commutator.

6. A material for sliding contacts used as a commutator of a small-sized DC motor, wherein said material for sliding contacts consists essentially of 0.01 to 3.0% Ni by weight, 0.01 to 3.0% MgO by weight, 0.01 to 5.0% Cu by weight, and the balance Ag, and wherein Ni metal particles and MgO particles are dispersed in a matrix of an AgCu alloy.

7. A clad composite material in which the material for sliding contacts according to claim 6 is embedded in part of a base material of Cu or a Cu alloy.

8. A small-sized DC motor that uses the clad composite material according to claim 7 as a commutator.

9. A clad composite material in which the material for sliding contacts according to claim 6 is embedded in part of a base material of Cu or a Cu alloy, at least part of the embedded material for sliding contacts being coated with Au or an Au alloy.

10. A small-sized DC motor that uses the clad composite material according to claim 9 as a commutator.

11. A material for sliding contacts used as a commutator of a small-sized DC motor, wherein said material for sliding contacts consists essentially of 0.01 to 3.0% Ni by weight, 0.01 to 6.0% ZnO by weight, 0.01 to 3.0% MgO by weight, 0.01 to 5.0% Cu by weight, and the balance Ag, and wherein Ni metal particles, ZnO particles and MgO particles are dispersed in a matrix of an AgCu alloy.

12. A clad composite material in which the material for sliding contacts according to claim 11 is embedded in part of a base material of Cu or a Cu alloy.

13. A small-sized DC motor that uses the clad composite material according to claim 12 as a commutator.

14. A clad composite material in which the material for sliding contacts according to claim 11 is embedded in part of a base material of Cu or a Cu alloy, at least part of the embedded material for sliding contacts being coated with Au or an Au alloy.

15. A small-sized DC motor that uses the clad composite material according to claim 14 as a commutator.

16. A clad composite material comprising material for sliding contacts in which the material for sliding contacts consists essentially of 0.01 to 3.0% Ni by weight, 0.01 to 6.0% ZnO by weight, and the balance Ag, wherein Ni metal particles and ZnO particles are dispersed in a matrix of Ag which is embedded in part of a base material of Cu or a Cu alloy.

17. A small-sized DC motor that uses the clad composite material according to claim 16 as a commutator.

18. A clad composite material comprising material for sliding contacts in which the material for sliding contacts consists essentially of 0.01 to 3.0% Ni by weight, 0.01 to 6.0% ZnO by weight, and the balance Ag, wherein Ni metal particles and ZnO particles are dispersed in a matrix of Ag which is embedded in part of a base material of Cu or a Cu alloy, wherein at least part of the embedded material for sliding contacts is coated with Au or an Au alloy.

19. A small-sized DC motor that uses the clad composite material according to claim 18 as a commutator.

20. A clad composite material comprising material for sliding contacts, in which the material for sliding contacts consists essentially of 0.01 to 3.0% Ni by weight, 0.01 to 3.0% MgO by weight, and the balance AG, wherein Ni metal particles and MgO particles are dispersed in a matrix of Ag which is embedded in part of a base material of Cu or a Cu alloy.

21. A small-sized DC motor that uses the clad composite material according to claim 20 as a commutator.

22. A clad composite material comprising material for sliding contacts, in which the material for sliding contacts consists essentially of 0.01 to 3.0% Ni by weight. 0.01 to 3.0% MgO by weight, and the balance Ag, wherein Ni metal particles and MgO particles are dispersed in a matrix of AG which is embedded in part of a base material of Cu or a Cu alloy, wherein at least part of the embedded material for sliding contacts is coated with Au or an Au alloy.

23. A small-sized DC motor that uses the clad composite material according to claim 22 as a commutator.

* * * * *